United States Patent [19]

Schenk

[11] 3,965,293
[45] June 22, 1976

[54] CIRCUIT ARRANGEMENT FOR VARYING THE PHASE OF A REFERENCE SIGNAL IN TRANSMISSION PATH DISTORTION MEASURING APPARATUS

[75] Inventor: Erwin Schenk, Munich, Germany

[73] Assignee: Siemens Aktiengesellschaft, Berlin & Munich, Germany

[22] Filed: Nov. 20, 1974

[21] Appl. No.: 525,514

[30] Foreign Application Priority Data
Nov. 20, 1973 Germany............................ 2357912

[52] U.S. Cl................................................ 178/69 A
[51] Int. Cl.².......................................... H04L 25/06
[58] Field of Search.............. 178/69 A, 69 R, 23 A; 328/162, 163, 164; 324/83 D

[56] References Cited
UNITED STATES PATENTS 3,182,127   5/1965   Wiese ............................... 178/69 A
3,396,240   8/1968   Abbey et al. ...................... 178/69 A
3,526,713   9/1970   Elvis et al. ........................ 178/69 A Primary Examiner—Thomas A. Robinson

[57] ABSTRACT

For use in connection with apparatus for determining the distortion characteristic of a data transmission path, a circuit arrangement is described for varying the phase of a reference signal against which the transmitted signal is compared in the receiver. A synchronizing device operates to produce a lag or lead in the pulse output of a timing generator, as a function of lagging or leading distortion. The synchronizing device is designed to operate according to a rectangular control characteristic so that the measured error values always relate to identical phase shifts in the reference signal.

6 Claims, 10 Drawing Figures

CIRCUIT ARRANGEMENT FOR VARYING THE PHASE OF A REFERENCE SIGNAL IN TRANSMISSION PATH DISTORTION MEASURING APPARATUS

BACKGROUND OF THE INVENTION

This invention relates to a circuit arrangement used in conjunction with devices which determine a distortion characteristics of a data transmission link for causing the phase of a received data element pulse train forming a reference signal to follow a signal transmitted through a transmission link, the received element pulse train being obtained using a timing signal produced by a pulse generator and a frequency-divider. In this context, by means of a synchronizing device a delay or lead is produced in individual pulses of the timing signal with lagging or leading distortion. The synchronizing device contains a counter which, on receiving counting pulses and depending upon the binary values of the received element train, increases or reduces its count, producing a signal when the count reaches zero.

In one known system for testing a transmission link, a test signal is transmitted through the link, and at the receiving end, the distortion of the transmitted signal is measured using a distortion meter, the received element train generated at the receiving end being used as the reference signal. Also, at the receiving end an error counter can be provided which is supplied with the transmitted test signal and with an identical test signal generated at the receiving end. However, this counter counts the number of errors occurring in the transmitted signal. In so doing, by means of a synchronizing device, the received element train is made to coincide in terms of frequency and phase with the transmitted signal.

An object of this invention is to provide a synchronizing device by means of which, in adjusting the frequency and phase of the reference signal, the accuracy of measurement of the error counter and/or of the distortion meter is affected as little as possible.

It is another object of this invention is to provide a synchronizing device which is designed to operate along a rectangular control characteristic, and is designed so that the instants of scanning, even in the presence of one sided distortion, occur at the centers of the elements in the transmitted signal.

SUMMARY OF THE INVENTION

In accordance with the invention, the synchronizing device of the circuit arrangement described hereinabove contains a first store, a second store, a third store, a counter and a logic circuit. The first store, in the presence of lagging distortion, produces a first storage signal, while the second store, in the presence of leading distortion, produces a second storage signal. In this context, when the first storage signal occurs, the counter is supplied with counting pulses, and the signal produced by the counter is applied to the third store, the latter then producing a third storage signal. The logic circuit can assume a first and a second state, remaining in its first stage when the second storage signal is absent. The logic circuit will remain in its first state when either of two conditions occur; these conditions are the second storage output signal being absent or the first, second and third storage output signals being present. The logic circuit will switch from the first to the second state when the second storage output signal is present and the third storage output signal is absent. The first or second binary value of the logic signal produces the delay or lead in the timing signal pulse.

The circuit arrangement in accordance with the invention has the advantage that it operates in accordance with a rectangular control characteristic, so that in carrying out signal error measurements the measured values obtained always relate to identical phase shifts in the received element train. The instants of scanning here are located at the centers of the elements in the transmitted signal, even in the presence of one sided distortion, so that one sided distortion phenomena of this kind can be properly measured.

In a preferred example of the invention, a bistable trigger stage is provided which is supplied at its input with the timing signal and which supplies a signal of lower pulse recurrence frequency to the frequency-divider. If there is lagging or leading distortion and a first or a second storage signal is produced, then the second trigger stage is retained in its rest state during half a period of the timing signal, so that from that point onwards the pulses furnished by its output are delayed by half a period. In the presence of leading distortion, in this fashion a determinate phaseshift in the signal applied to the frequency-divider, of half a period of the timing signal, is produced. With leading distortion, a pulse is interleaved into the signal applied to the frequency-divider. Consequently, the pulse edges of the signal are given a certain lead. In this fashion, both with lagging and with leading distortion, a determinate phase-shift, identical in magnitude in each case, is produced in the received element pulse train or reference signal.

The circuit arrangement in accordance with the invention is of particular significance in the situation where a signal is being transmitted through a transmission link and the signal errors, in particular distortion and data errors, are to be measured. The synchronizing device causes the phase of the reference signal to perform a follow-up action so that the results of measurement are affected as little as possible by the changes in phase to the reference signal.

BRIEF DESCRIPTION OF THE DRAWINGS

In the following a preferred embodiment of the invention will be described making references to FIGS. 1 through 10 which are described briefly below. Items of identical kind and illustrated in several figures have been given the same references throughout.

DETAILED DESCRIPTION OF THE DRAWINGS

Figure 1:
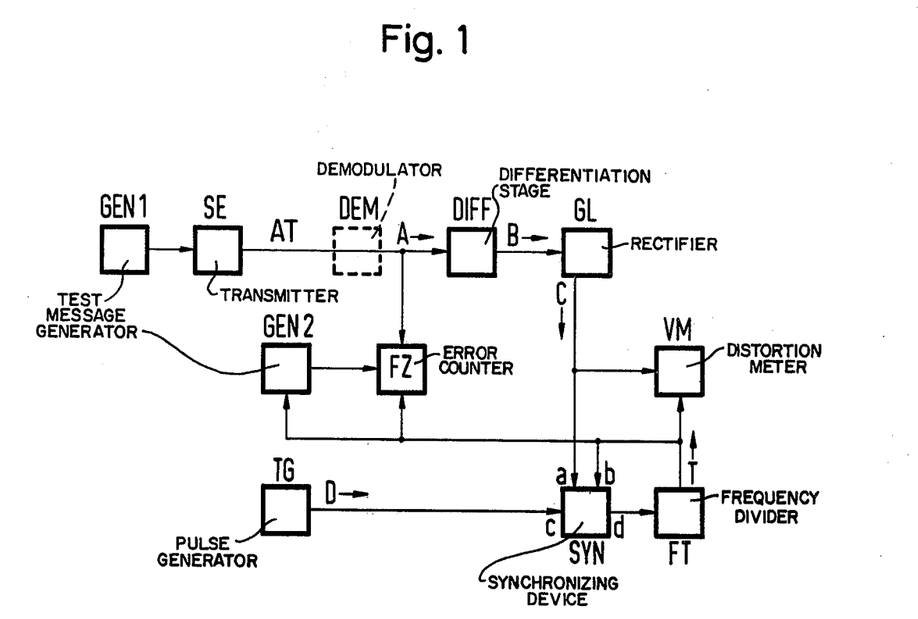
FIG. 1 illustrates a block circuit diagram of a circuit arrangement for measuring telegraphy distortions and for counting transmission errors.

FIG. 1 shows a test message generator GEN1 which produces a binary signal, the individual bits of wich are contained within a given bit pattern. For example, the signal produced by the test message generator GEN1 can be identical to the signal A shown in FIG. 3. The two binary values of signals of this kind are indicated by references 0 and 1. The signal A is applied to the transmitter SE and then transmitted through a transmission link AT. If transmission is carried out using frequency modulation or phase modulation, at the receiving end a demodulator DEM is provided producing a signal containing the same information as the signal A furnished by the test message generator GEN1.

Irrespective of the way in which the signal A is transmitted, at the receiving end a differentiation stage DIFF, a rectifier GL, a test message generator GEN2, an error counter FZ, a distortion meter VM, a pulse generator TG, a synchronizing device SYN and a frequency-divider FT are provided.

The test message generator GEN2 produces a signal which is identical to the signal A generated by the test message generator GEN1. The signals produced by the test message generators GEN1 and GEN2 are compared with one another in the error counter FZ in a manner known per se, and the errors detected are counted and displayed as an error rate. The circuit arrangement shown in FIG. 1, therefore, has the task of counting data errors and measuring distortion, of the kind which occur with transmission of a test message through the transmission link AT.

The synchronizing device SYN fulfills the function of bringing the reference signal T into alignment with the signal A in terms of frequency and phase. In order to influence the accuracy of measurement of the error counter FZ and of the distortion meter VM as little as possible by adjustment of frequency and phase of the reference signal T using the synchronizing device SYN a slight and constant phase-shift in the reference signal T is produced. The signal A is differentiated by the differentiation stage DIFF and the differentiated signal applied to the rectifier GL. The rectifier GL supplies the signal C to the synchronizing device SYN which receives from the pulse generator TG a signal D.

Figure 2:
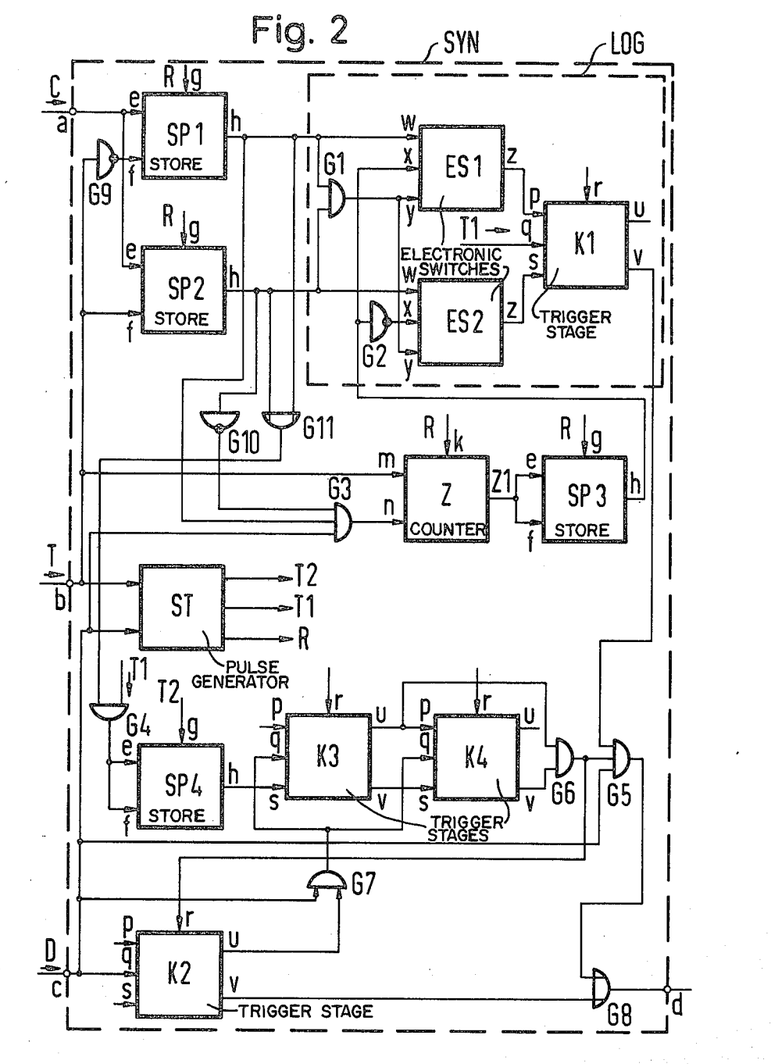
FIG. 2 is a block circuit diagram of the synchronizing device in the FIG. 1 embodiment.

FIG. 2 illustrates in greater detail the construction of the synchronizing device SYN shown in FIG. 1. This comprises stores SP1 - SP4, counter Z, electronic switches ES1, ES2, trigger stages K1, K2, K3, K4, gates G1 – G11, and pulse generator ST. The binary stores SP1 – SP4 each have three inputs, $e$, $f$, $g$, and each an output $h$. Their two stable states are designated as 0 and 1 states. During the time of their 0 and 1 states, they produce, via their outputs h, a 0 or 1 signal as the case may be. A change from the 0 state to the 1 state takes place if 1 signals are in each case applied to the inputs $e$ and $f$. Resetting to their 0 states takes place if a 1 signal is applied to the inputs g.

The counter Z, via its input $n$, is supplied with the counting pulses. With the binary states of the reference signal, i.e., T=0 or T=1, which is applied to the input of the counter $m$, in association with the applied counting pulses, the counts are increased or reduced. Via the output, a short signal Z1 is produced when the count, commencing from positive values, reaches the value 0. The counter is reset by the application of a 1 signal to the input $k$.

The electronic switches ES1 and ES2 have the inputs $w$, $x$, $y$ and the outputs $z$. The table below illustrates how the signal produced at the output z depends upon the signal $w$, $x$, and $y$ applied to the inputs.

| w | x | y | z |
|---|---|---|---|
| 0 | 0 | 0 | 0 |
| 1 | 0 | 0 | 1 |
| 0 | 1 | 0 | 0 |
| 1 | 1 | 0 | 1 |
| 0 | 0 | 1 | 0 |
| 1 | 0 | 1 | 0 |
| 0 | 1 | 1 | 1 |
| 1 | 1 | 1 | 1 |

The bistable trigger stages K1 to K4 have the inputs $p$, $q$, $r$ and $s$ and the outputs $u$ and $v$. They occupy their 0 and 1 states when, via the output v, they are producing a 0 or 1 signal. A transfer from the 0 state to the 1 state takes place with the appearance of a negative pulse edge at the input $q$ with a 0 signal at the input $p$ and a 1 signal at the input $s$. Transfer from the 1 state to the 0 state takes place with a negative pulse edge at the input $q$, with a 1 signal at the input $p$ and a 0 signal at the input $s$. If a 1 signal is applied to the input $r$, the trigger stages remain in the 0 state. The gates, G1, G3, G4, G5, G6, G7 are AND-gates. The gates G2, G8, G11 are OR-gates, the gates G2, G9, G10 are inverters.

The gates G1, G2, the electronic switches ES1, ES2 and the trigger stage K1, form a logic circuit LOG which can assume two stable states determined by the two stable states of the trigger stage K1. These two stable states are designated as the 0 state and 1 state, respectively. During the period of the 0 state and the 1 state, the logic circuit LOG, via the trigger stage K1, produces the logic signal K1v = 0, as the case may be.

The logic signal depends upon the binary values of the signals supplied by the outputs $h$ of the stores SP1, SP2, and SP3. The signals will be defined in the following by the same references as the stores SP1, SP2, and SP3 by which they are issued. If the logic circuit LOG adopts its 0 state, then it remains in this state whatever the signal SP1, if the signal SP2=0 and whatever the signal SP3, or if SP1=1, and SP3=1. The logic circuit assumes its 1 state if, whatever the signal SP1, the signal SP2=1 and SP3=0 occur. The logic circuit remains in its 1 state if the signal SP1=0 is obtained, and the signals SP2 and SP3 are in either of their states. The logic circuit converts from the 1 state to the 0 state either if the signals SP1=1, SP2=0 occur, and the signal SP3 is arbitrary, or if the signals are SP1=1, SP2=1, and SP3=1.

In the following the mode of operation of the synchronizing device shown in FIG. 2 will be explained making reference to FIGS. 3 to 8.

Figure 3:
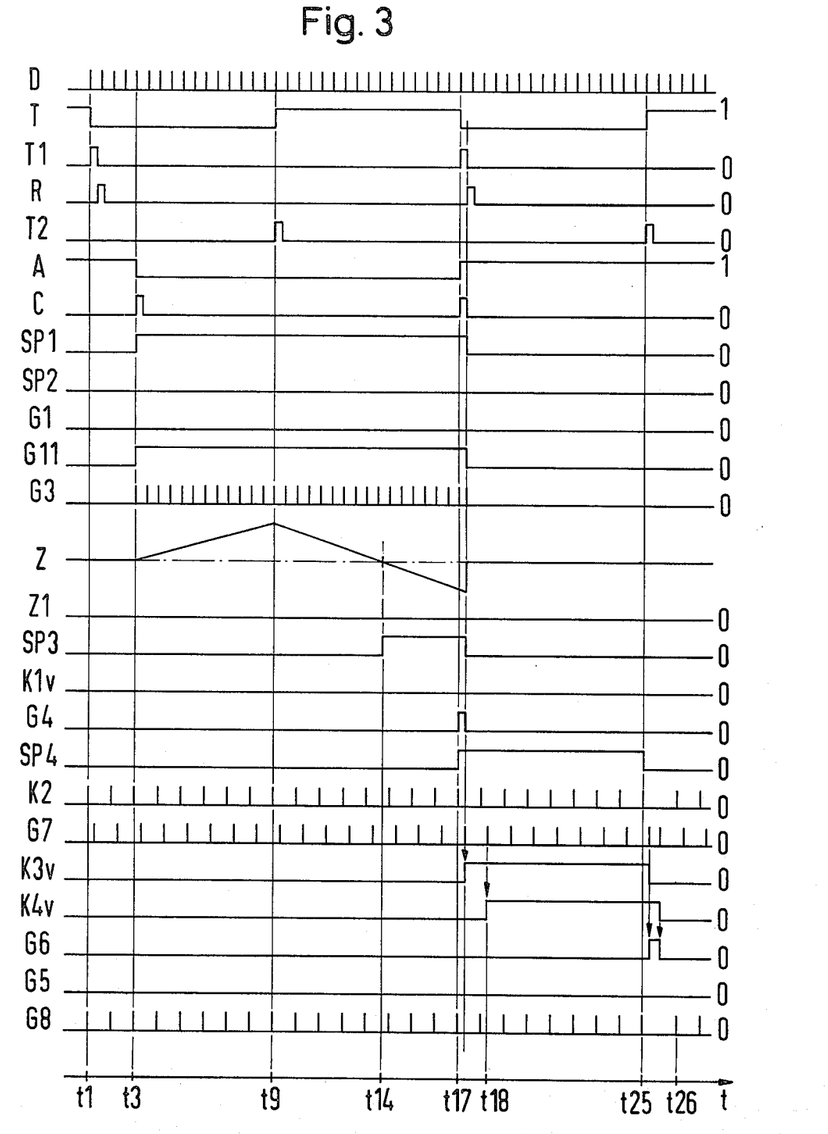
FIGS. 3 through 7 are time-waveform diagrams of signals which occur in operation of the synchronizing device shown in FIG. 2.

At the top, FIG. 3 illustrates the signal D produced by the pulse generator TG shown in FIG. 1. To simplify illustration, relatively few individual pulses of this signal D have been shown. The reference signal T is generated using the frequency-divider FT shown in FIG. 1. The signal T, as will be discussed, provides a reference basis for distortion measurement and error counting. The positive pulse edge of signal T occurring at the time $t9$, should coincide with the element center of signal A, in the adjusted state. The negative edges of the reference signal T, occurring at the instants $t1$ and $t17$, should ideally coincide with the edges of the signal A. If an edge of signal A occurs within the instants $t1$ and $t9$, then this means lagging distortion. If the edge of the signal A occurs between the instants $t9$ and $t17$, then we have leading distortion. The signals of FIG. 3 thus show lagging distortion.

The pulse generator ST generates the signals T1, T2 and R. From the signal A, the signal C is derived by differentiation and rectification.

Most of the signals shown in FIGS. 3 through 7 have been given the same references as the stages and outputs which produce them. For example, the signal SP1 in FIG. 3 is produced by the store SP1 which has been shown in FIG. 2.

At the instant $t3$, at both inputs $e$ and $f$ of the store SP1, 1 signals are applied so that from the instant $t3$ onwards, the signal SP1=1 is produced. Shortly after the instant $t17$, the store SP1 is reset by the signal R so that it produces the signal SP1=0 again. The store SP2, making the same assumptions, produces the signal SP2=0 continuously; thus the signal G1=0 is continuously emitted. The signal G11 is identical to the signal SP1 and, during the time of the signal SP1=1, the pulses of signal D are passed by the gate G3 so that the signal G3 is obtained.

The individual pulses of the signal G3 are used as counting pulses and are applied to the counter Z whose count, from the instant $t3$ up to the instant $t9$, is increased and then reduced until resetting of the counter. At the instant $t14$, the count reaches 0, and consequently, the signal Z1 is applied to store SP3. Depending upon the output signals from the stores SP1 – SP3 the gates G1, G2, G11 and the electronic switches ES1, ES2, via the output $v$ of the trigger stage K1 the signal K1v=0 is continuously produced.

At the instant $t17$, with G11=1 and T1=1, the signal G4=1 is produced so that the store SP4 produces the signal SP4=1 up to the instant $t25$, at which the signal T2 produces resetting. Via the outputs $v$ of the trigger stages K3 and K4, the signals K3v and K4v, respectively, are produced so that the gate G6 briefly conducts, after the instant $t25$, and produces the signal G6. The trigger stage K2 operates as a frequency-divider with a division ratio of 2:1. Shortly after the instant $t25$, through the action of the signal G6, the trigger stage K2 is left in its 0 state so that the period elapsing from $t26$ to $t25$ is longer than the period of the signal G8 at the other instants. Because, due to K1v=0, no pulse is interleaved into the signal G8 via the gate G5, via the output $d$ and from the instant $t26$ onwards, the pulses of the signal G8 are fed with a delay of half a period into the frequency-divider FT shown in FIG. 1. Thus, the pulse edges of the reference signal T are also slightly delayed. Because of this delay, the reference signal T is shifted in phase and the lagging distortion is thus compensated in a step by step manner.

Figure 4:
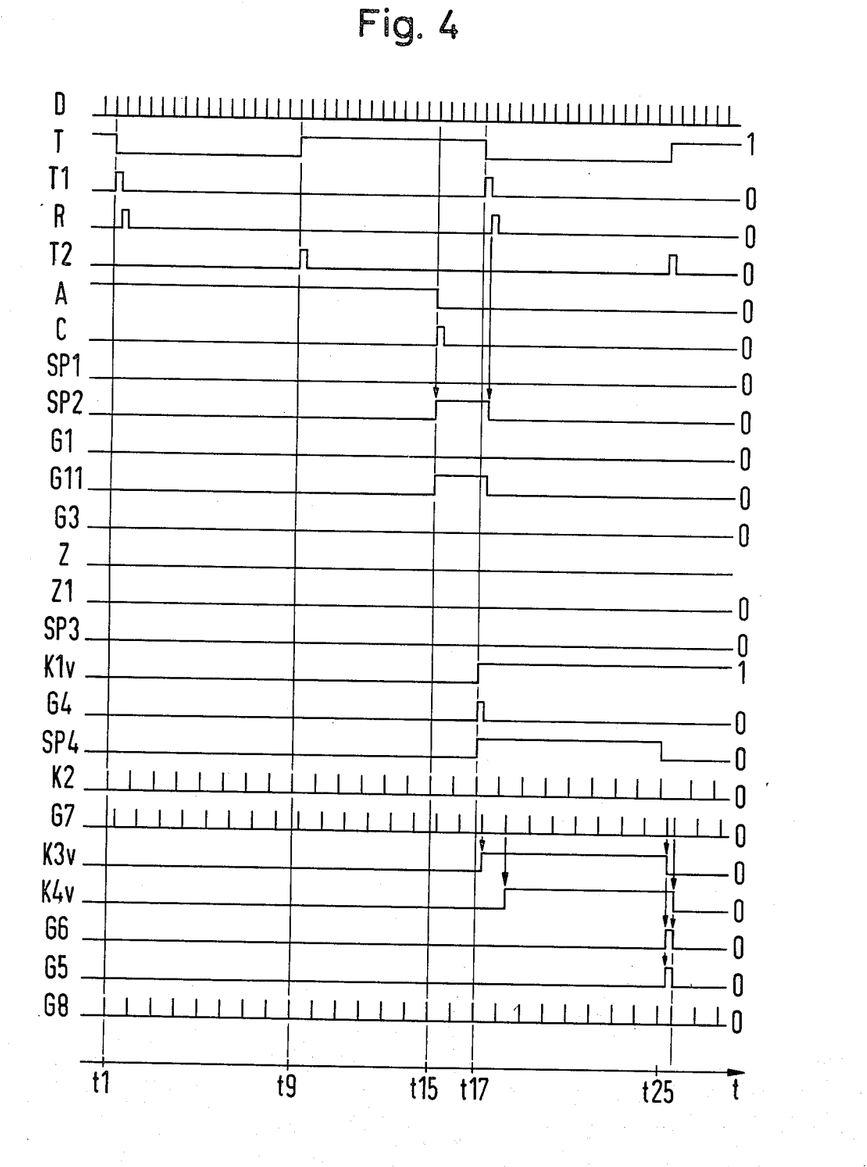

FIG. 4 relates to leading distortion in the edge of signal A, occurring at the instant $t15$. The signals T=1 and G=1 are responsible for the signal SP2=1 which is produced until, with the signal R, shortly after the instant $t17$ the store SP2 is reset. The signal G11 is identical to SP2. The gate G3, because of the presence of the signal SP1=0, continuously blocks the signal D so that no counting pulses arrive at the counter Z, and, as a further consequence, no signal Z1=1 and no signal SP3=1 are derived. Under these conditions, the trigger stage K1, from the instant $t17$ onwards, will be placed in its 1 state furnishing the signal K1v via the output $v$.

From the instant $t17$ onwards, the gate G4 will be briefly opened by the signals G2=1 and T1=1 so that the store SP4, from the instant $t17$ to $t25$, will produce a signal SP4=1. Via the outputs $v$ of the trigger stages K3 and K4, respectively, are produced. These overlapping each other shortly after the instant $t25$ so that the signal G6 is produced. With the signal G6, as in the case of FIG. 3, the trigger stage K2 is briefly left in its zero state, after the instant $t25$, while with the signals K1v=1, G6=1 and D=1, the signal G5=1 is produced, and this is interleaved into the signal produced by the trigger stage K2. In this way, from the instant $t25$ onwards the edges of the signals G8 are given a lead of half a period so that the ensuing edges of the reference signal T also acquire a lead, and the leading distortion is counteracted.

Figure 5:
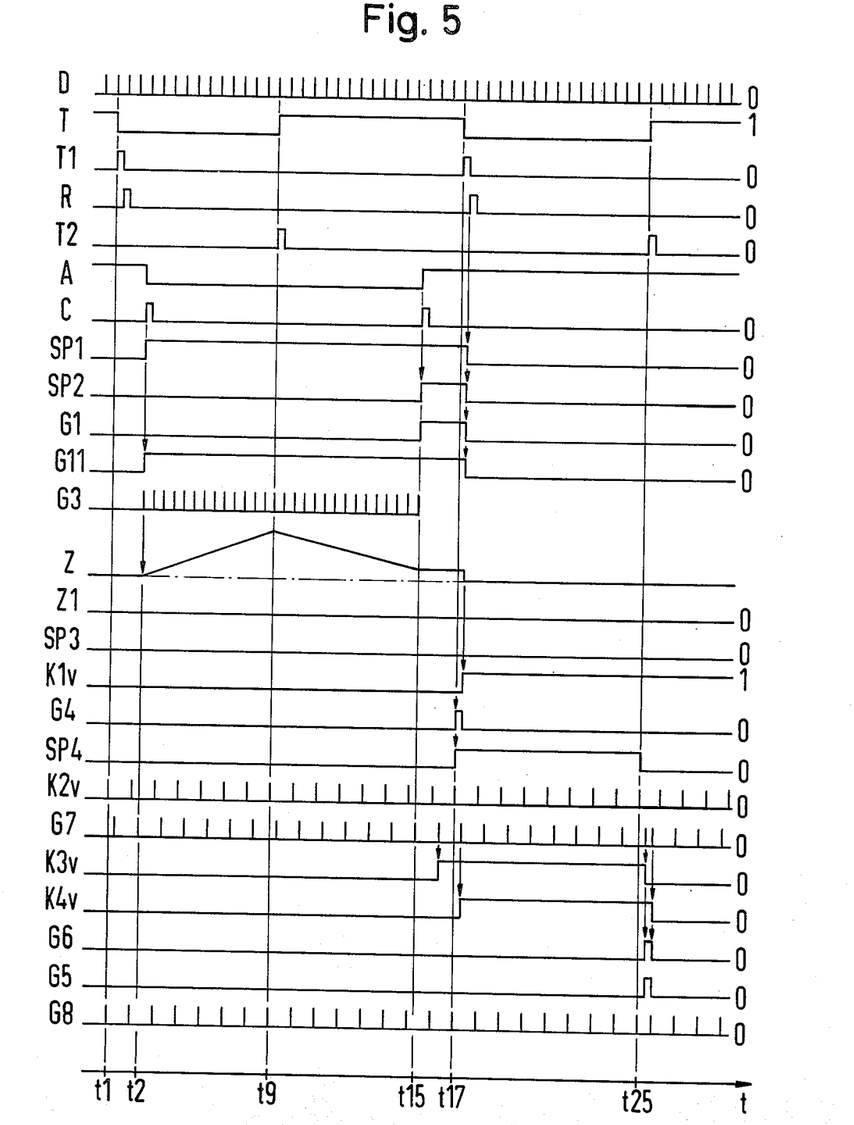

FIG. 5 relates to the case in which the edge of signal A, occurring at the instant $t2$, is lagging, while the edge occuring at the instant $t15$ is leading. First of all, it will be assumed that the lagging distortion is smaller than the leading distortion and that, thus, the interval $t2-t1$ is shorter than $t17-t15$.

The signals C, SP1, SP2, G1, G11 are generated in a manner similar to that already described. From the instant $t2$ to the instant $t15$, pulses of the signal G3 are applied as counting pulses to the counter Z which initially counts forwards up to the instant $t9$, and then backwards. Although at the instant $t15$, it has not yet reached a count of zero. Thus, no signal Z1=1 is produced.

The signals G4, SP4, K2v, G5, K3v, K4v, G6, G7 are generated in the manner already described in relation to FIG. 4 so that from the instant $t25$ onwards, the pulses of the signal G8 have a lead. In this fashion, the pulse edges of the reference signal T also acquire a lead, and the predominantly leading distortion is counteracted.

Figure 6:
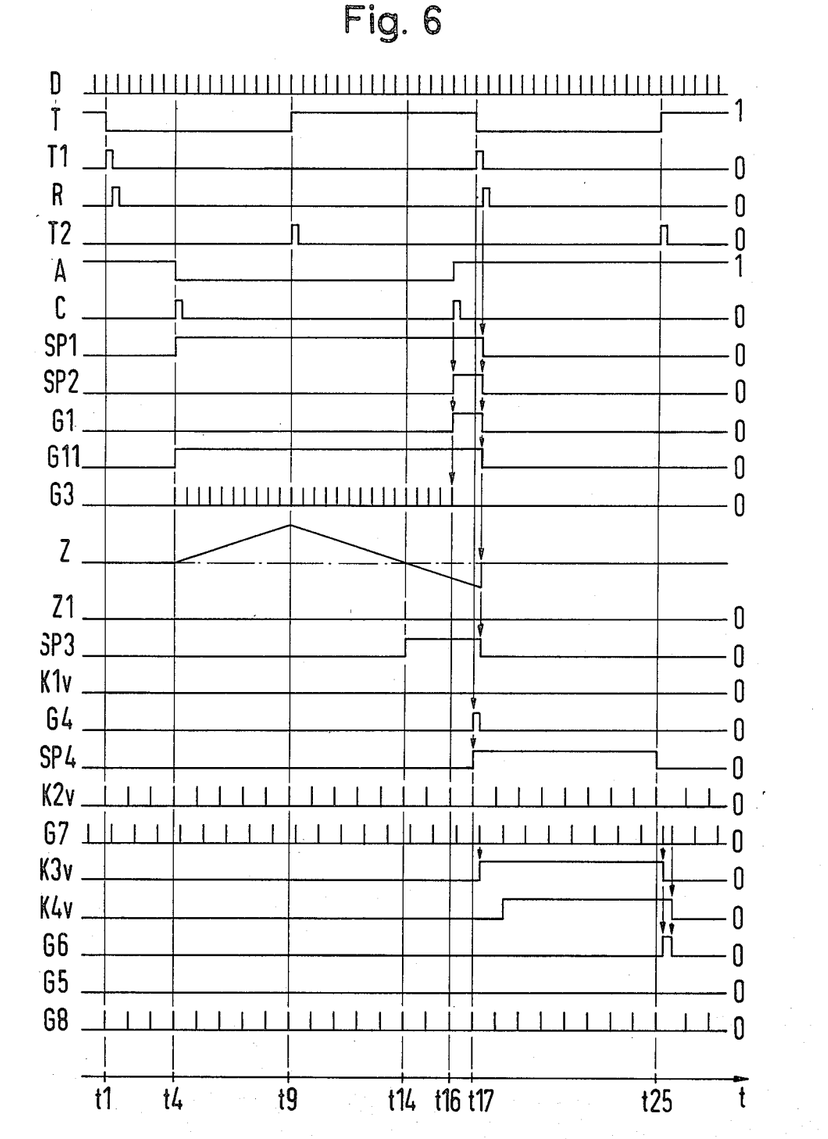

FIG. 6 relates to the case in which the edge of signal A, occurring at the instant $t4$, is lagging, and the edge of signal A, occurring at the instant $t16$, is leading, in relation to the corresponding edges of the received element train T at the instants $t1$ and $t17$. It has been assumed here that the interval $t4-t1$ is longer than $t17-t16$. In this case, the count of zero is reached at the instant $t14$, and a corresponding pulse of the signal Z1 is produced. The signals G4, SP4, K2v, G5, K4v, G6, G7 are derived in the manner already described in relation to FIG. 3.

In this fashion the pulse edges of the reference signal T are delayed, and the predominantly lagging distoration is counteracted.

Because, in accordance with FIGS. 5 and 6, the predominantly leading and lagging distortions are counteracted, the reference signal T is adjusted in such a way that the sum of the leading distortions is equal to the sum of the lagging distortions. The positive edges of the reference signal T, which at the instant $t9$ characterize the instants of scanning, thus occur at the centers of the signal elements representing signal A. Thus, even one sided distortion effects can be accurately determined.

Figure 7:
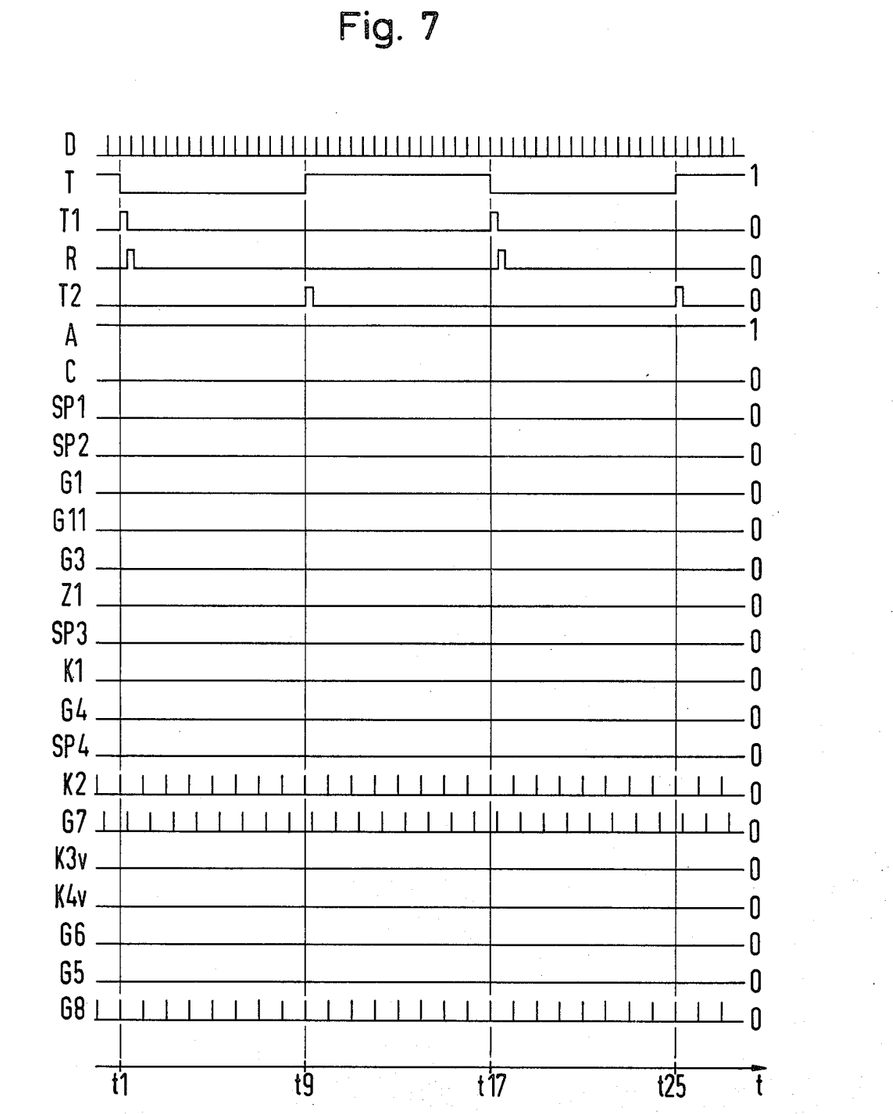

FIG. 7 relates to the case in which no pulse edge of signal A occurs and signal C=0 is continuously produced. Consequently, the signals Sp1=0 and SP2=0 are produced, and the signal G8 is, therefore, not affected so that the further consequence is that there is no phase-shift in the reference signal T.

Figure 8:
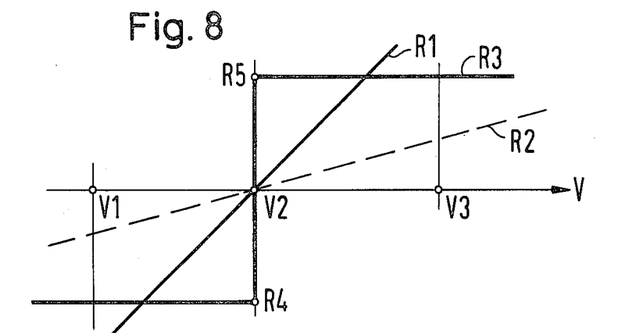
FIG. 8 diagrammatically illustrates control characteristics of synchronizing devices.

FIG. 8 illustrates several control characteristics. The abscissae are used to plot the distortion V. The distortion V1 marks a distortion of —50% and the distortion V2 a distortion of 0%, while the distortion V3 marks a distortion of +50%. The ordinates plot the controlled condition.

The control characteristic R1 pertains to the kind of control in which the controlled condition is proportional to the distortion V and in which the generated controlled conditions are relatively large in comparison with the disstortions which have occurred. A synchronizing device operating in accordance with control characteristic R1 would not be very suitable for the present purpose because the controlled condition so radically affects the distortion that measurement of the distortion or counting of the data errors would no longer be possible.

It is conceivable to use the control characteristic R2 in order, as a function of the distortions occurring, to produce relatively small controlled conditions. However, control in accordance with this characteristic R2 would have the drawback that the pull-in range would be too small.

The synchronizing device shown in FIG. 2 operates in accordance with the control characteristic R3, so that distortions in the range between V1 and V2 produce a constant negative controlled condition R4, and distortions in the range between V2 and V3 a constant positive controlled condition R5.

From FIGS. 3 through 7, this situation can be appreciated from a consideration of the signal G8 illustrated there. The pulses of G8, from the instant $t25$ onwards, are delayed by half a period in the presence of predominantly lagging distortion, while they are advanced by half a period in the presence of predominantly leading distortion. This effect occurs irrespective of the magnitude of the distortion occurring.

The control characteristic R3 is distinguished in the context of the problems of distortion measurement and error counting with which we are concerned here, by the fact that the controlled conditions R4 and R5 always produce slight and constant phase shifts in the reference signal T so that the results of measurement obtained are always related to the same absolute magnitude of the controlled condition. The control characteristic R3 is distinguished, furthermore, by an adequately wide pull-in range.

Figure 9:
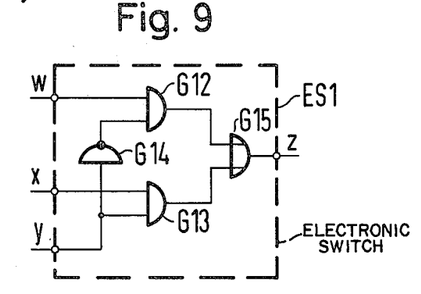
FIG. 9 is a schematic diagram of the electronic switch shown schematically in FIG. 2.

FIG. 9 illustrates an example of the electronic switch ES1 shown schematically in FIG. 2 and comprising AND-gates G12, G13, inverter G14, and OR-gate G15.

Figure 10:
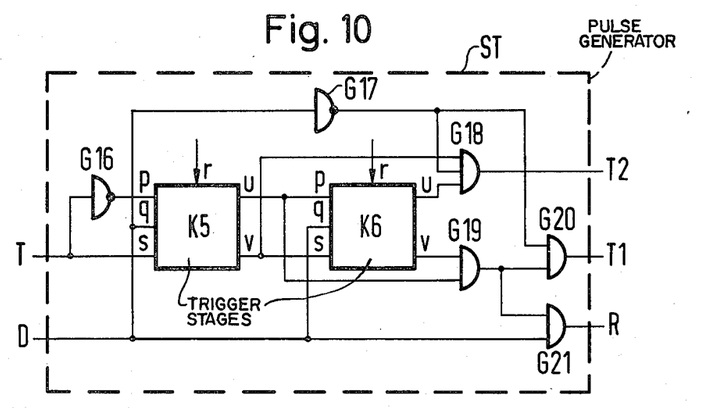
FIG. 10 is a schematic diagram of the pulse generator illustrated schematically in FIG. 2.

FIG. 10 illustrates an example of the pulse generator ST schematically shown in FIG. 2 and comprising two inverters G16, G17, AND-gates G18 – G21, and trigger stages K5, K6, which are designed in the same way as the trigger stages K1 – K4 described in reference to FIG. 2. At the input side, the reference signal T and the signal D are applied, and at the output side, the signals T1, T2 and R are produced.

The principles of the invention have been described hereinabove in terms of a preferred embodiment constructed accordingly. It is contemplated that the described embodiment can be modified or changed in a variety of ways while remaining within the scope of the invention as defined by the appended claims.

I claim:

1. In apparatus for determining the distortion on a data transmission path, a circuit arrangement for adjusting the phase of a reference signal produced from a timing signal in the receiver relative to a signal received over said data transmission path, comprising:
   first storage means for producing an output signal responsive to lagging distortion,
   second storage means for producing an output signal responsive to leading distortion,
   counter means for operating responsive to said reference signal to count counting pulses and for producing a signal upon reaching a predetermined count value,
   means for supplying counting pulses to said counter means responsive to the presence of said first storage means output signal,
   third storage means for receiving said counter output signal and producing an output signal responsive thereto,
   logic circuit means capable of assuming first and second states for producing a binary output signal, said logic circuit means being constructed to remain in its first state when said second storage output signal is absent or when said first, second and third storage output signals are present, said logic circuit means being constructed to switch from said first to said second state when said second storage output signal is present and said third storage output signal is absent and
   means responsive to said logic circuit binary output signal for producing delay or lead in said reference signal.

2. The circuit arrangement defined in claim 1 wherein said logic circuit means comprises:
   first gate means having inputs connected, respectively, to said first storage means output and second storage means output,
   second gate means having an input connected to said third storage means output,
   first electronic switch means having inputs connected, respectively, to an output of said first gate means, said first storage means output and said third storage means output,
   second electronic switch means having inputs connected, respectively, to said first gate means output, said second gate means output and said second storage means output and
   first trigger means for producing said binary output signal responsive to the outputs from said first and second electronic switch means.

3. The circuit arrangement defined in claim 1 wherein said means for supplying counting pulses comprises:
   pulse generator means, and
   third gate means having inputs connected to receive said pulse generator means output, said first storage means output and an inverted second storage means output, an output of said third gate means being connected to an input of said counter means.

4. The circuit arrangement defined in claim 1 further comprising:
   means for producing a first control signal,
   fourth gate means having inputs connected, respectively, to said first storage means output or said second storage means output and to the output of said means for producing said first control signal,
   fourth storage means having an input connected to an output of said fourth gate means,
   fourth storage means having an input connected to an output of said fourth gate means,
   second trigger means having an input connected to an output of said fourth storage means and
   means responsive to said first and second trigger stages for producing a second control signal.

5. The circuit arrangement defined in claim 4 further comprising:
   fifth gate means having inputs connected to receive the output of said logic means and said second control signal, and wherein said means for producing a first control signal includes:

third trigger means connected to receive said timing signal, sixth gate means having inputs connected, respectively, to the output of said fifth gate means and the output of said third trigger means and frequency divider means having an input connected to the output of said sixth gate means, the output of said frequency divider means forming said first control signal.

6. The circuit arrangement defined in claim 5 further comprising:

means for producing a third control signal having pulses occurring shortly after those of said first control signal and means for resetting said first, second and third storage means responsive to said third control signal.

* * * * *